United States Patent [19]

Marsh et al.

[11] Patent Number: 5,105,662

[45] Date of Patent: Apr. 21, 1992

[54] LIQUID LEVEL MEASUREMENT SYSTEM

[75] Inventors: Norman F. Marsh, Port Huron; Randall J. Regentin, Deckerville, both of Mich.

[73] Assignee: Bindicator Company, Port Huron, Mich.

[21] Appl. No.: 681,719

[22] Filed: Apr. 8, 1991

[51] Int. Cl.$^5$ ............................................. G01F 23/14
[52] U.S. Cl. ........................................... 73/299; 73/714
[58] Field of Search ........................................... 73/299

[56] References Cited

U.S. PATENT DOCUMENTS

| | | |
|---|---|---|
| 2,121,743 | 6/1938 | Oyen . |
| 3,221,551 | 12/1965 | Hogan et al. . |
| 3,283,092 | 11/1966 | Grostick . |
| 3,693,738 | 9/1972 | Andrews ........................... 73/299 X |
| 3,777,698 | 12/1973 | Hunter ............................... 73/299 X |
| 3,986,398 | 10/1976 | Laymance ............................. 73/299 |
| 4,567,761 | 2/1986 | Fajeau . |

Primary Examiner—Daniel M. Yasich
Attorney, Agent, or Firm—Barnes, Kisselle, Raisch, Choate, Whittemore & Hulbert

[57] ABSTRACT

A system for measuring level of liquid material in a containment vessel that includes a hollow conduit composed of a first conduit section having an upper end coupled to a pressure sensor and a lower end disposed within the vessel. A second conduit section is coupled to the lower end of the first conduit section and extends downwardly therefrom at least to a minimum material measurement level within the vessel. The second conduit section has a vertical height coordinated with the maximum desired material measurement level within the vessel such that pressure of air captured within the first conduit section at such maximum material level prevents entry of the liquid material into the first conduit section. The cross sectional area of air flow within the second conduit section is at least ten times, and preferably at least sixteen times, greater than the cross sectional area to air flow within the first conduit section. Thus, the volume of air captured within the air column formed by the first and second conduit sections is minimized, thereby minimizing the effects of temperature-induced fluctuations of column air pressure. On the other hand, liquid level within the air column remains at all times within the conduit section of larger diameter, thereby reducing the likelihood of clogging of the small-diameter conduit section due to sediments or the like carried by the liquid.

4 Claims, 2 Drawing Sheets

LIQUID LEVEL MEASUREMENT SYSTEM

The present invention is directed to systems for measuring level of liquid material in a containment vessel as a function of pressure of air captured within a conduit that extends vertically into the vessel.

BACKGROUND AND OBJECTS OF THE INVENTION

U.S. Pat. No. 3,283,092 discloses a liquid level indicator that includes a housing for mounting on a liquid containment vessel and a hollow conduit that extends from the housing into the vessel. The lower end of the conduit is positioned within the vessel so as to be engaged by liquid as the liquid rises and falls within the vessel. When the liquid within the vessel covers the open lower end of the conduit, air is captured within the conduit, and air pressure within the conduit increases as liquid level increases. A pressure sensor within the housing is coupled to the upper end of the conduit for indicating level of material when the pressure of air captured within the conduit increases to the set point of the pressure sensor.

The apparatus disclosed in the noted patent is thus a point-level sensor for indicating that the level of material within the vessel has reached a point that corresponds to the pressure sensing threshold of the pressure sensor. However, the principles disclosed in the noted patent have also been employed in continuous-type liquid level sensors in which the conduit extends vertically through the vessel between an open lower end positioned adjacent to the bottom of the vessel, and an upper end coupled to a suitable mechanism for indicating level of liquid within the vessel as a continuous function of pressure of air captured within the conduit. Devices of this character are disclosed, for example, in U.S. Pat. Nos. 2,121,743 and 3,221,51. A problem arises in systems of this character, however, due to temperature fluctuations of the air captured within the conduit. That is, temperature drift and non-linearities caused by temperature-induced variations in air pressure within the conduit can cause errors on the order of 0.3%/°C. in conventional continuous-type systems of this character. It is a general object of the present invention to provide a continuous-type liquid level measurement system of the described character that is so constructed as to substantially reduce the effects of temperature variations in the captured air column.

SUMMARY OF THE INVENTION

A system for measuring level of liquid material in a containment vessel in accordance with the present invention includes a hollow conduit composed of a first conduit section having an upper end coupled to a pressure sensor and a lower end disposed within the vessel. A second conduit section is coupled to the lower end of the first conduit section and extends downwardly therefrom at least to a minimum material measurement level within the vessel. The second conduit section has a vertical height coordinated with the maximum desired material measurement level within the vessel such that pressure of air captured within the first conduit section at such maximum material level prevents entry of the liquid material into the first conduit section. The cross sectional area of air flow within the second conduit section is at least ten times, and preferably at least sixteen times, greater than the cross sectional area to air flow within the first conduit section. Thus, the volume of air captured within the air column formed by the first and second conduit sections is minimized, thereby minimizing the effects of temperature-induced fluctuations of column air pressure. On the other hand, liquid level within the air column remains at all times within the conduit section of larger diameter, thereby reducing the likelihood of clogging of the small-diameter conduit section due to sediments or the like carried by the liquid.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
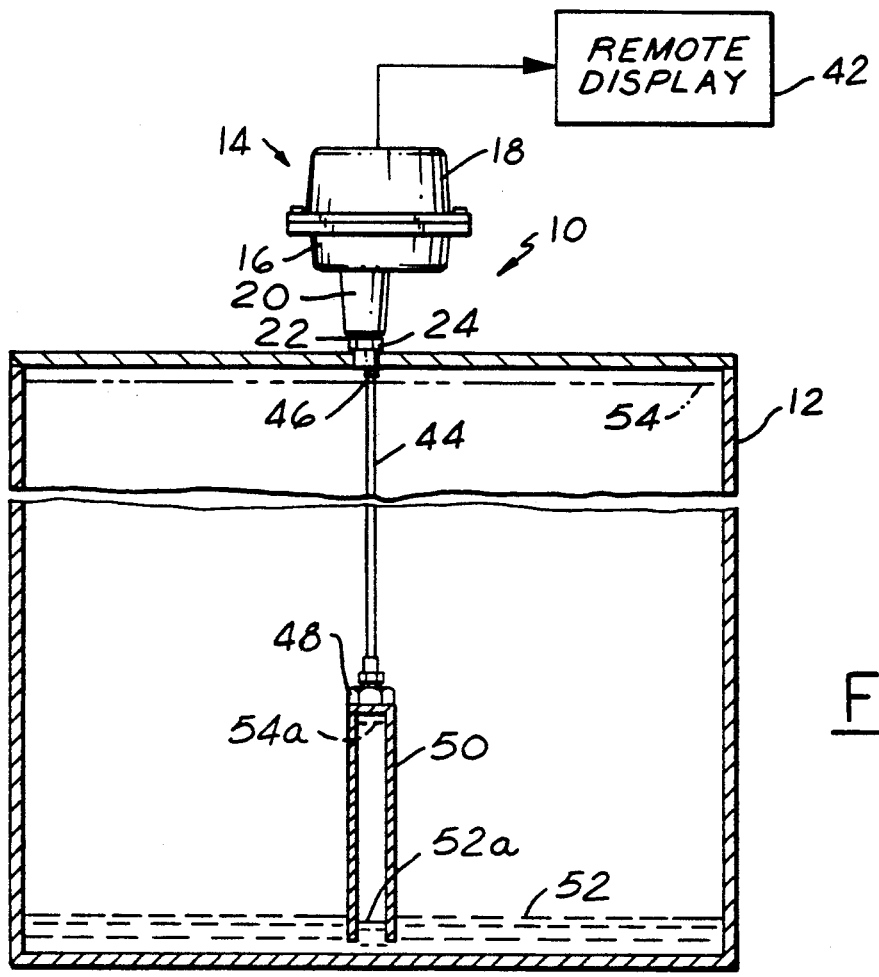
FIG. 1 is a fragmentary sectional view that illustrates a liquid level measurement system in accordance with a presently preferred embodiment of the invention.
Figure 3:
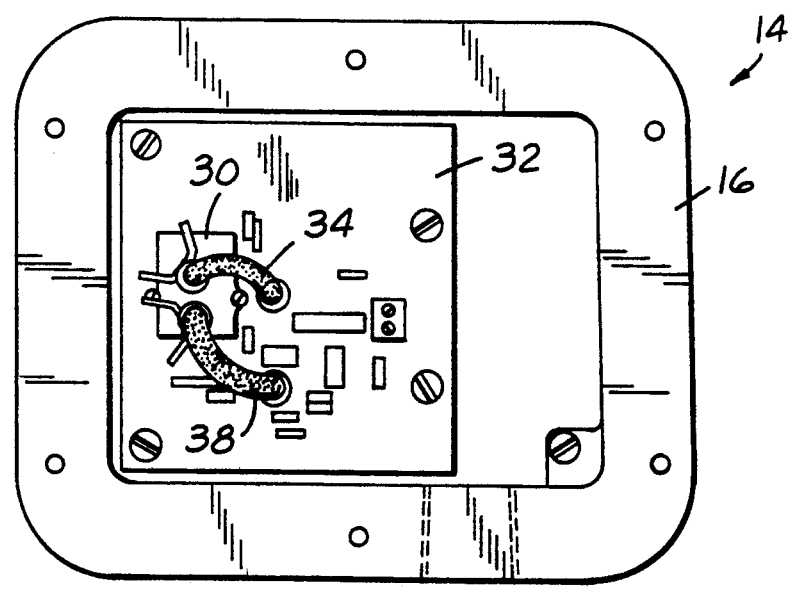
FIG. 3 is a plan view of the device illustrated in FIG. 2 with the housing cover removed.

The drawings illustrate a system 10 for indicating level of liquid material in a containment vessel 12, in accordance with a presently preferred embodiment of the invention, as comprising a housing 14 formed by opposed cup-shaped base and cover housing sections 16,18. A hollow neck 20 integrally projects from base 16 to a lower end that threadably receives a mounting connector 22. The base-remote end of connector 22 is adapted to be threadably received into a hollow gland 24 affixed to the top of vessel 12. A pair of separate parallel passages 26,28 extend longitudinally through connector 22.

A differential pressure sensor 30 is carried by a circuit board assembly 32 that is mounted on base 16 within housing 14. Pressure sensor 30 may be of any suitable conventional type. One input of pressure sensor 30 is connected by a flexible tube 34 and a fitting 36 to one end of passage 26 in connector 22. The other pressure input of sensor 30 is connected by a flexible tube 38 and a fitting 40 to the adjacent end of passage 28 in connector 22. Pressure sensor 30 and associated electronics on circuit board assembly 32 are connected by suitable cabling to a remote display 42 (FIG. 1) for providing a continuous indication of material level within vessel 12. One suitable pressure sensor and 4-20 ma transmitter circuit is sold by Sensym under the model designation SSAN-30.

Figure 2:
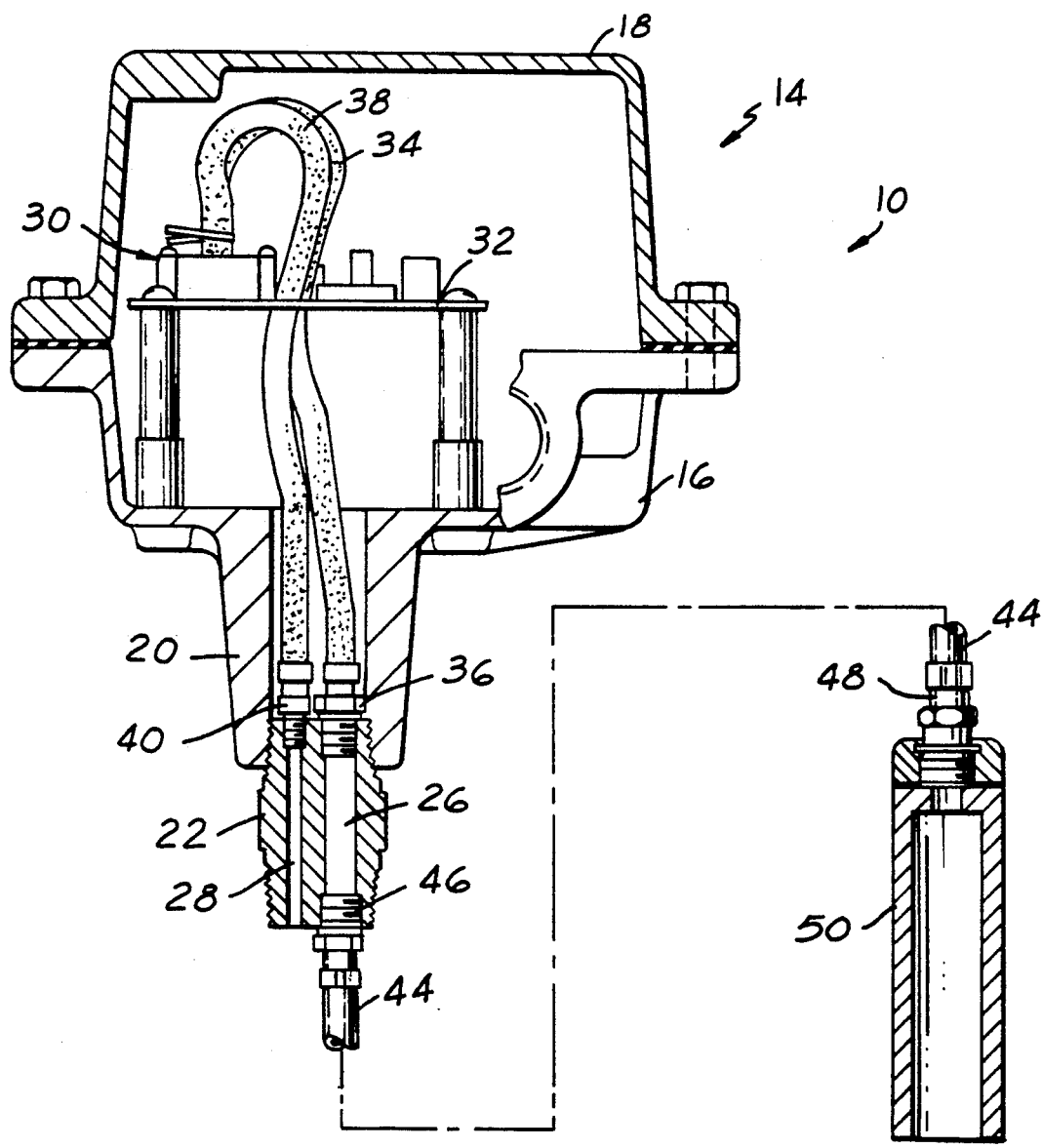
FIG. 2 is a fragmentary sectional view on an enlarged scale of the system illustrated in FIG. 1.

An elongated section 44 of hollow flexible tubing is connected at one end to a fitting 46 received in the open outer end of connector passage 26. The opposing end of tubing 44 is connected by a fitting 48 to a section 50 of rigid conduit, such as metal pipe. The overall combined length of tubing 44 and pipe 50 is such that the open lower end of pipe 50 is positioned adjacent to the bottom of vessel 12 when housing 14 is mounted to the top wall of the vessel, as shown in FIG. 1. The length of pipe 50 is coordinated with the minimum height 52 and the maximum height 54 (FIG. 1) of desired material level measurement within the vessel. The open lower end of the pipe is covered by the liquid at minimum height 52 so as to capture air within pipe 50 and tubing 44, and increase air pressure to a level above ambient sufficient to indicate presence material at remote display 42. The length of pipe 50 is also coordinated with maximum height 54 such that material within pipe 50 rises no higher than the height 54a (FIG. 1), and does not enter tubing 44. Stated differently, the overall length of pipe 50 is coordinated with maximum desired measurement level 54 such that the pressure of air captured within tubing 44 is sufficient to prevent entry of liquid into the tubing when the material is at its maximum height. Pipe 50 thus effectively forms a reservoir in which liquid level varies as a function of head pressure of liquid within vessel 12. The pressure of the air column captured within tubing 44 and pipe 50 likewise varies with material head pressure. Connector passage 28 (FIG. 2) opens into the headspace of vessel 12, and thereby provides a reference level to differential pressure sensor 30. The material level indication to display 42 thus varies as a function of material level independent of headspace pressure within the vessel.

To reduce the volume of the air column within tubing 44 and reservoir pipe 50, and thereby reduce the temperature-induced pressure fluctuations on the pressure sensor, the ratio of the effective cross sectional area to air flow within pipe 50 to tubing 44 is made at least 10/1 and preferably at least 16/1. In a working embodiment of the invention, pipe 50 is composed of standard ¾ inch pipe, and tubing 44 is composed of standard ⅛ inch reinforced tubing. The ratio of the cross sectional areas to air flow between pipe 50 and tubing 44 in this embodiment is approximately 24/1. Larger ratios are preferable for enhanced reduction of the effects of temperature fluctuations. In one embodiment of the invention for measuring level of water material in a 30 foot vessel, the length of tube 44 is 345 inches and the length of pipe 50 is 15 inches.

Although the invention has been disclosed in conjunction with a presently preferred embodiment thereof, modifications and variations may be implemented without departing from the principles of the invention in their broadest aspects. For example, instead of using flexible (or rigid) tubing 44 of reduced diameter as compared with the diameter of pipe 50, the invention may be implemented by employing a single length of rigid pipe, for example, and filling the upper portion of the pipe with beads or microspheres so as to reduce the effective cross sectional area of that portion of the pipe. Connector passage 28 (FIG. 2) and tubing section 38 may be eliminated, so that the reference input to the differential pressure sensor 30 is effectively coupled to ambient air pressure within housing 14. Where density of the liquid material whose level is to be measured departs significantly from the density of water, the length of reservoir pipe 50 must also be varied to accommodate the liquid density.

We claim:

1. A system for measuring level of liquid material in a vessel between predetermined minimum and maximum measurement levels that includes a hollow conduit adapted to extend vertically into the vessel between at least said minimum and maximum measurement levels, said conduit having an open lower end disposed at or below said minimum level, and pressure sensing means closing an upper end of said conduit for indicating level of material in vessel between said maximum and minimum levels as a continuous function of air pressure in the conduit, characterized in that said conduit comprises, a first conduit section having an upper end coupled to said pressure sensing means and a lower end disposed within the vessel, and a second conduit section coupled to said lower end of said first conduit section and extending downwardly therefrom at least to said minimum level, said second section having a vertical height coordinated with distance between said predetermined levels such that pressure of air captured within said first section prevents entry of liquid material into said first section at said maximum level, said second section having a cross sectional area to air flow at least ten times greater than said first section.

2. The system set forth in claim 1 wherein said second section has a cross sectional area to air flow at least sixteen times greater than said first section.

3. The system set forth in claim 1 wherein said pressure sensing means comprises a differential pressure sensor having a first pressure input coupled to said first conduit section and means for coupling a second pressure input of said sensor to headspace of the vessel.

4. A system for indicating level of liquid material in a vessel up to a predetermined maximum level of material in the vessel, said system comprising:

a housing including means for mounting said housing adjacent to the top of a vessel in which material level is to be measured, elongated first conduit means open at one end to the interior of the housing and extending therefrom into the vessel when said housing is mounted on the vessel, second conduit means coupled to an end of said first conduit means remote from said one end, said second conduit means having an open end remote from said first conduit means disposed in a lower portion of the vessel when the housing is mounted on the vessel, and pressure sensing means within said housing operatively coupled to said one end of said first conduit means for indicating level of material within the vessel, as a function of air pressure within said first and second conduit means, said second conduit means having a cross section to air flow at least ten times greater than said first conduit means and having a length coordinated with said predetermined maximum level such that pressure of air captured within said first conduit means prevents entry of liquid material into said first conduit means when the material is at said maximum level.

* * * * *